(No Model.)
A. E. S. HOWARD.
COCKEYE.
No. 471,640. Patented Mar. 29, 1892.
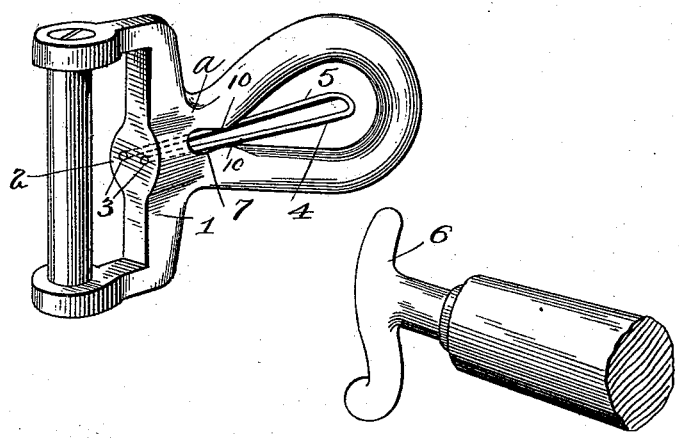
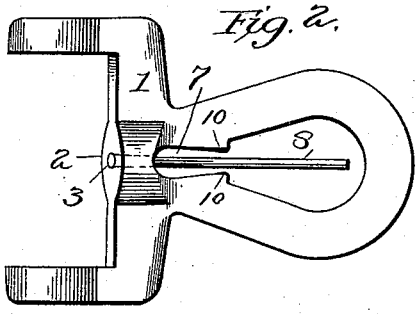
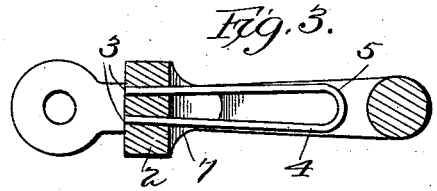
Attest
Henry E. Cooper
J. E. Middleton
Inventor
Asbury E. S. Howard
by Walter Donaldson & Co.
Att'ys.

UNITED STATES PATENT OFFICE.

ASBURY E. S. HOWARD, OF SPRINGFIELD, ILLINOIS.

COCKEYE.

SPECIFICATION forming part of Letters Patent No. 471,640, dated March 29, 1892.

Application filed November 14, 1891. Serial No. 411,930. (No model.)

*To all whom it may concern:*

Be it known that I, ASBURY E. S. HOWARD, a citizen of the United States of America, residing at Springfield, in the county of Sangamon and State of Illinois, have invented certain new and useful Improvements in Cockeyes, of which the following is a specification, reference being had therein to the accompanying drawings.

It is the object of my invention to provide a cockeye with a safety attachment which shall be simple in construction and arranged in such a manner as to be protected by the loop of the cockeye against accidental breakage or displacement.

It is a further object to provide a safety spring or arm in the form of a loop, inclosed within the loop of the cockeye and providing a broad bearing-surface to press upon the hook or other part engaging with the cockeye.

My invention includes a specially-formed shank of the cockeye with a safety spring or arm run through said shank and projecting within the loop of the cockeye.

In the drawings, Figure 1 is a perspective view of the loop form of safety-spring combined with the cockeye, and Fig. 2 is a plan view of another form. Fig. 3 is a sectional view of Fig. 1.

The cockeye is substantially of usual form, with the exception that the shank *a* is formed with a deep notch 7, extending from the opening through the loop to the cross-bar 1. The cross-bar is formed centrally with an enlargement 2, and through this enlargement openings 3 are formed extending into the deep notch. Into these two openings the ends of a spring-arm 4 are inserted, and the loop portion 5 of the spring extends centrally within the loop of the cockeye, so as to be inclosed thereby. The loop portion 5 of the safety-spring widens out toward its end and its sides are substantially flush with the sides of the cockeye-loop, as shown in Fig. 3, so that a broad bearing is afforded; but the spring-arm is completely inclosed and protected by the cockeye-loop. It will be noticed, further, that the arms of the safety-loop are in a plane at right angles to the plane of the sides of the cockeye-loop, and no matter how the hook 6 is engaged with the cockeye its shank will be borne upon by the full width of the safety-arm, and thus not only held securely, but also prevented from rattling. The hook may be inserted from either side with the same result, the bearing-surface being the same in either case, and the spring may thus be prevented from being permanently bent either one way or the other. The sides of the deep notch extend close to the sides of the safety-loop at the points 10 and act as stops, intermediate of the length of the loop, which prevent severe bending of the arm and strain at the point of connection. By reason of forming the enlargement 2 on the cross-bar the bar is not weakened by cutting the notch and the openings.

In Fig. 2 a modification is shown in which a straight spring-rod 8 is driven through the opening in the cross-bar through the deep notch and centrally into the cockeye-loop to be inclosed thereby.

I am well aware that it is not broadly new to provide a cockeye with a safety-spring, and I do not wish to claim this feature in a broad sense.

What I claim as my invention is—

In combination, a cockeye having a deep notch in its shank forming stop-shoulders and a wire spring having its end embedded in the shank and passing through the deep notch into the loop of the cockeye, with its sides in close proximity to the stop-shoulders 10, whereby the said spring will find a bearing against the stop-shoulders when pressed aside, substantially as described.

In testimony whereof I affix my signature in presence of two witnesses.

ASBURY E. S. HOWARD.

Witnesses:
W. A. SILVERS,
CHARLES MEYERS.